United States Patent [19]

Sakakibara et al.

[11] 3,880,825
[45] Apr. 29, 1975

[54] DES-HIS[2],ALA[2] AND PHE[3,5] ANALOGS OF LUTEINIZING HORMONE RELEASING FACTOR

[75] Inventors: Shunpei Sakakibara; Terutoshi Kimura, both of Osaka, Japan

[73] Assignee: Daiichi Seiyaku Co., Ltd., Tokyo, Japan

[22] Filed: Sept. 25, 1973

[21] Appl. No.: 400,699

[30] Foreign Application Priority Data
Sept. 26, 1972 Japan................................ 47-96497
Sept. 26, 1972 Japan................................ 47-96498
Sept. 26, 1972 Japan................................ 47-96499

[52] U.S. Cl............................. 260/112.5; 424/177
[51] Int. Cl.. C07c 103/52; C07g 7/00; A61k 27/00
[58] Field of Search................................ 260/112.5

[56] References Cited
OTHER PUBLICATIONS
Vale et al., Science, 176, 933–934 (1972).

White, W. F., "Annual Reports in Medicinal Chemistry," Vol. 8, R. V. Heinzelman, ed., Academic Press, New York (1973), pp. 212–213.

Rivier et al., Chimia, 26, 300–303 (1972), cited in Chem. Abstr. 88836a (1972).

Primary Examiner—Lewis Gotts
Assistant Examiner—Reginald J. Suyat
Attorney, Agent, or Firm—Oblon, Fisher, Spivak, McClelland & Maier

[57] ABSTRACT

Peptides represented by the general formula:

(pyro)Glu-Y-Gly-Leu-Arg-Pro-Gly-NH$_2$ wherein Y represents Trp-Ser-Tyr, Ala-Trp-Ser-Tyr or His-Phe-Ser-Phe, are prepared by reacting Y-Gly-Leu-Arg-Pro-Gly-NH$_2$ and derivatives thereof with a reactive ester of pyroglutamic acid. The compounds are useful for controlling the release of luteinizing hormone.

2 Claims, No Drawings

DES-HIS[2],ALA[2] AND PHE[3,5] ANALOGS OF LUTEINIZING HORMONE RELEASING FACTOR

BACKGROUND OF THE INVENTION

1. Field of the Invention

This invention relates generally to polypeptides and more particularly, to a novel nonapeptide and decapeptides and their method of preparation.

2. Description of the Prior Art

It is well known that upon hydrolysis protein may be fragmented. The fragments from this protein hydrolysis containing two or more α-amino acid molecules linked via an amide linkage are known as peptides. Peptides may also be synthesized by such well known reactions as the condensation of an α-halo acid chloride with the ethyl ester of an amino acid or of the next lower polypeptide. The ester group can be saponified under mild conditions without attack of the peptide links and then the α-halo acid can be aminated and the reaction sequence repeated if necessary.

SUMMARY OF THE INVENTION

One object of this invention is to provide a novel nonapeptide and decapeptides represented by the general formula (I), (pyro)Glu-Y-Gly-Leu-Arg-Pro-Gly-NH$_2$ (I)

wherein Y represents Trp-Ser-Tyr, Ala-Trp-Ser-Tyr or His-Phe-Ser-Phe.

Another object of this invention is to provide a novel synthetic method of preparation of polypeptides.

Yet another object of this invention is to provide polypeptides which have activities for controlling the release of luteinizing hormone.

Briefly, these and other objects of the invention as hereinafter will become apparent are achieved by reacting specific protected octa- or nonapeptides with a reactive ester of pyroglutamic acid and then treating the reaction product with hydrogen fluoride to obtain the novel polypeptides.

DETAILED DESCRIPTION OF THE PREFERRED EMBODIMENTS

The novel nonapeptide and decapeptides of this invention are represented by the general formula (I),

(I)

wherein Y represents Trp-Ser-Tyr, Ala-Trp-Ser-Tyr or His-Phe-Ser-Phe. The amino acid residue is represented by the initial three letters of the parent amino acid throughout this specification and claims except that Tryp and (pyro)Glu represents tryptophan and pyroglutamic acid residues respectively.

The peptides of this invention have activities for controlling the release of luteinizing hormone hereinafter referred to as LH and may be applied to the treatment of various human disorders such as endometriosis, climaterium disorders and the like, or to a method of contraception.

Various peptides were synthesized and their properties investigated. As a result, the following three peptides, which have the common fragment, Gly-Lev-Arg-Pro-Gly-NH$_2$, were discovered to be effective in controlling the release of LH. That is, (pyro)Glu-Trp-Ser-Tyr-Gly-Leu-Arg-Pro-Gly-NH$_2$ (Peptide A) and (pyro)Glu-Ala-Trp-ser-Tyr-Gly-Lev-Arg-Pro-Gly-NH$_2$ (Peptide B) were effective to lower the concentration of LH in the blood and (pyro)Glu-His-Phe-Ser-Phe-Gly-Leu-Arg-Pro-Gly-NH$_2$ (Peptide C) was effective to promote the release of LH. Therefore, by using controlled amounts of Peptide A or Peptide B and Peptide C, the concentration of LH in the blood can be controlled.

The following gives the outline for the method of preparation of the polypeptides of this invention. Accordingly, octa- or nonapeptide which may also contain protective groups for the amino acids and which is defined by formula (II),

(II)

wherein Y represents Trp-Ser-Tyr, Ala-Trp-Ser-Trp or His-Phe-Ser-Phe, is reacted with a reactive ester of pyroglutamic acid to produce nona- or decapeptide having protective groups. The resulting protected polypeptide is treated with hydrogen fluoride to remove the protective groups.

The synthesis of Peptide A, Peptide B and Peptide C is illustrated below in detail.

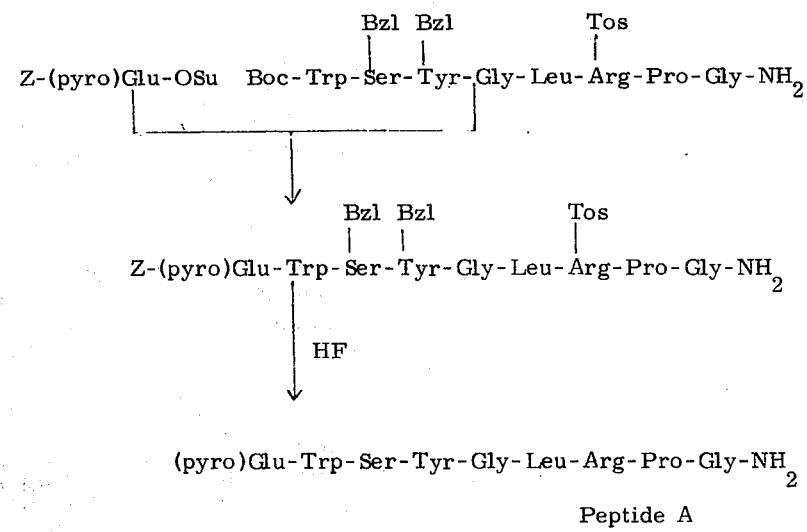

Peptide A

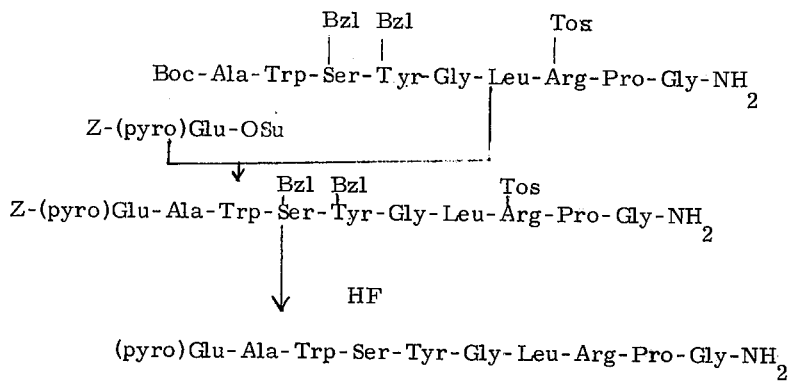

Peptide B

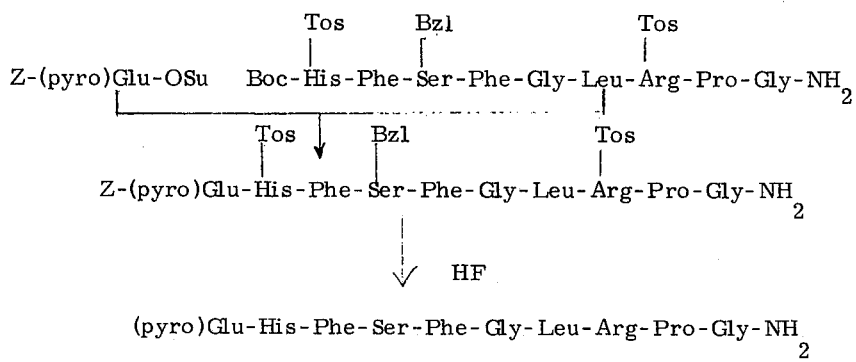

Peptide C

In the illustration, the symbols used are defined as below:

Boc: tertiary-butyloxycarbonyl group
B21: benzyl group
Tos: p-toluenesulfonyl group
Z: benzyloxycarbonyl group
Su: succinimide group
Aoc: tertiary amyloxycarbonyl group
Np: p-nitrophenyl group The kind of protective groups which may be used to protect the amino acids is not critical or limited to those used in the preceeding illustration but may be replaced by any other protective groups conventionally used in preparing polypeptides. For example, Bzl, Boc and Su can be replaced with a tertiary butyl group, Aoc and Np respectively.

The activities effecting the release of LH of the present polypeptides were measured by the following technique using as a comparative the activity of extracted procine LH-RH. Porcine LH-RH is defined in German Offenlegunsschrift No. 2,243,066 laid open Mar. 8, 1972.

i. Animals

Female rats belonging to the Sprage Dawhly strain were ovariectomized and injected with a mixture of 50 μg of estradiol benzoate (E) and 36 mg of progesterone (F) by subcutaneous injection. Five of the thus treated rats were used as a group for this experiment.

ii. Samples

Peptide A, Peptide B, Peptide C and LH-RH were each dissolved in a physiological saline solution at the concentration of 1.0mg/ml and kept in the dark under cooling. The solutions were diluted at use.

iii. Measurement of LH

Double antibody of radioimmunoassay was employed to measure the concentration of LH in the blood serum of the rats. A Rat-RIA-Kit made by National Institute of Arthritis & Metabolic Diseases (NIAMD) was used in accordance with the method of Parlow et al. (Abstract, The 51st Meeting of Endocrine Society, page 83 (1969)).

iv. Procedure

To a rat anesthetized with sodium hexobarbital, 0.1 ml of the sample is injected through the femoral vein. After ten minutes, the blood was collected from the abdominal main artery and used to measure the concentration of LH.

The activity of each Peptide is calculated from the following equatiton.

$$\text{Activity } (\%) = \frac{C_{analogue} - C_{control}}{C_{LH-RH} - C_{control}} \times 100$$

$C_{analogue}$: Concentration of LH in the serum of the rat to which 100 ng/rat of Peptide A, Peptide B or Peptide C was administered (ng=0.001μg).

$C_{LH-RH}$: Concentration of LH in the serum of the rat to which 100ng/rat of LH-RH was administered.

$C_{control}$: Concentration of LH in the serum of the rat to which a physiological saline solution was administered.

The results are shown in Table I.

TABLE I

|  | Activity (%) |
|---|---|
| Peptide A | −37 |
| Peptide B | −35 |
| Peptide C | 40 |

Having generally described the invention, a more complete understanding can be obtained by reference to certain specific examples, which are included for purposes of illustration only and are not intended to be limiting unless otherwise specified.

EXAMPLE 1

Preparation of
Z-(pyrol)Glu-Trp-Ser(Bzl)-Gly-Leu-Arg(Tos)-Pro-Gly-NH$_2$

To 348 mg of Boc-Trp-Ser(Bzl)-Tyr(Bzl)-Gly-Leu-Arg(Tos)-Pro-Gly-NH$_2$, 0.5 g of ethylenethioglycol, 65 mg of skatole and 5 ml of trifluoroacetic acid were added with stirring under cooling and the solution was stirred at room temperature for 45 minutes. Trifluoroacetic acid was removed by distillation under reduced pressure to give an oily product which was added in ether to precipitate. The precipitate was decanted with ether several times and dried in a desiccator over NaOH. Then the precipitate was dissolved in dimethylformamide (DMF) and the resulting solution was adjusted to pH 7 by adding 0.1 ml of N-methyl morpholine with stirring under cooling. To this solution, 180 mg of Z-(pyro)Glu-OSu was added and the solution was stirred for three days at room temperature. To the reaction solution, ethylacetate was added to cause precipitation and the precipitate was reprecipitated with chloroform-ethylacetate twice to give 345 mg (89.6%) of the desired product. Mp. 141.5° – 146.0°C.

EXAMPLE 2

Preparation of
(pyro)Glu-Trp-Ser-Tyr-Gly-Leu-Arg-Pro-Gly-NH$_2$

This procedure was carried out in a hydrogen fluoride reaction vessel. 240 mg of Z-(pyro)Glu-Trp-Ser(Bzl)-Tyr(Bzl)-Gly-Leu-Arg(Tos)-Pro-Gly-NH$_2$, 33 mg of tryptophan, 20 mg of skatole and 0.5 ml of anisole were combined. To the mixture, 5 ml of hydrogen fluoride was added under cooling and stirred for 70 minutes at 0°C. The hydrogen fluoride was then removed by distillation at the same temperature. The resulting residue was dried in a desiccator over NaOH and dissolved in water. After the aqueous solution was washed with ether, the solution was placed on a column of ion-exchange resin Dowex 1 × 2 (AcO$^-$) and eluted with water. The eluate was lyophilized to give a powder. The powder was placed on a column of Sephadex 'G-25 and eluted with 0.2N acetic acid. The main fractions were collected and lyophilized to give 129 mg of the desired product. When the product was subjected to paperchromatography and electrophoresis, a single spot was obtained in both cases whose ninhidrin reaction was negative and Pauri reaction positive.

EXAMPLE 3

Preparation of
Boc-Ala-Trp-Ser(Bzl)-Tyr(Bzl)-Gly-Leu-Arg(Tos)-Pro-Gly-NH$_2$

Following the same procedure as Example 1 except that 510 mg of Boc-Trp-Ser(Bzl)-Tyr(Bzl)-Gly-Leu-Arg(Tos)-Pro-Gly-NH$_2$, 0.1 ml of ethylenethioglycol (HSCH$_2$CH$_2$OH), 96 mg of skatole, 3 ml of trifluoroacetic acid and 150 mg of Boc-Ala-OSu were used; there was obtained a yield of 430 mg (78.6%) of the desired product having a melting point of 152.0° – 155.5°C (decomp.).

Analysis calculated for C$_{59}$H$_{68}$O$_{12}$N$_{14}$·2CH$_3$COOH·4H$_2$O
C 51.44, H 6.84, N 15.85
Found    C 51.33, H 6.87, N 16.30

Amino acid analysis (6N HCl, 105°C, 48 hrs.)
Glu 1.09, Trp 0.66, Ser 0.84, Tyr 0.99, Gly 2.04, Leu 1.00, Arg 0.95, Pro 1.01

EXAMPLE 4

Preparation of
Z-(pyro)Glu-Ala-Trp-Ser(Bzl)-Tyr(Bzl)-Gly-Leu-Arg(Tos)-Pro-Gly-NH$_2$ Following the same procedure as Example 1 except that 400 mg of Boc-Ala-Trp-Ser(Bzl)-Tyr(Bzl)-Gly-Leu-Arg(Tos)-Pro-Gly-NH$_2$, 0.1 ml of ethylenethioglycol, 70 mg of skatole, 3 ml of trifluoroacetic acid and 194mg of Z-(pyro)Glu-OSu were used, there was obtained a yield of 335 mg (76.3%) of the desired product having a melting point of 184.5° – 187.0°C (decomp.)

EXAMPLE 5

Preparation of
(pyro)Glu-Ala-Trp-Ser-Tyr-Gly-Leu-Arg-Pro-Gly-NH$_2$

This reaction was carried out in a hydrogen fluoride reaction vessel. 250 mg of Z-(pyro)Glu-Ala-Trp-Ser(Bzl)-Tyr(Bzl)-Gly-Leu-Arg(Tos)-Pro-Gly-NH$_2$, 33 mg of tryptophan, 20 mg of skatole and 0.5 ml of anisole were mixed together. To this mixture, 5 ml of hydrogen fluoride was added under cooling and stirred at 0°C for 80 minutes. The hydrogen fluoride was then removed by distillation at the same temperature. The resulting residue was dried in a desiccator over NaOH and dissolved in water. After the aqueous solution was washed with ether, the solution was placed on a column of ion-exchange resin Dowex 1 × 2 (AcO$^-$) and eluted with water. The eluate was lyophilized to give a powder. The powder was placed on a column of Sephadex G-25 and eluted with 0.2N acetic acid. The main fractions were collected and lyophilized to give 103 mg of the desired product. When the product was subjected to paperchromatography and electrophoresis, a single spot was obtained in both cases whose ninhidrin reaction was negative and Pauri reaction positive.

Analysis calculated for C$_{52}$H$_{73}$O$_{13}$N$_{15}$·2CH$_3$COOH·5H$_2$O
C 50.70, H 6.91, N 15.84
Found    C 50.47, H 6.76, N 16.19

Amino acid analysis (6N HCl, 105°C, 48 hours)
Glu 1.13, Ala 1.03, Ser 0.84, Tyr 1.01, Gly 2.04, Leu 1.00, Arg 0.96, Pro 1.07.

EXAMPLE 6

Preparation of
(pyro)Glu-His-Phe-Ser-Phe-Gly-Leu-Arg-Pro-Gly-NH$_2$

To 400 mg of Boc-Ser(Bzl)-Phe-Gly-Leu-Arg(Tos)-Pro-Gly-NH$_2$, 3 ml of trifluoroacetic acid (CF$_3$COOH) was added with stirring under cooling. Then, the solution was stirred for 45 minutes at room temperature and trifluoroacetic acid was removed by distillation to give an oily product which was added to ether to precipitate. The precipitate was washed with ether several times and dried in a desiccator over NaOH. The thus obtained precipitate was dissolved in 1 ml of dimethylformamide (DMF) and the resulting solution was adjusted to pH 7 by adding 0.08 ml of N-methylmorpholine with stirring under cooling. To this solution, 193 mg of Aoc-Phe-ONp was added and the mixture was stirred for four days at room temperature. To the reaction solution, ethylacetate was added to cause precipitation and the precipitate was reprecipitated with chloroformethylacetate twice to give 390 mg (85.3%) of Aoc-Phe-Ser(Bzl)-Phe-Gly-Leu-Arg(Tos)-Pro-Gly-NH$_2$, having a melting point of 142.5–146.5°C.

To 371 mg of this product, 3 ml of trifluoroacetic acid was added with stirring under cooling, and the resulting solution was stirred for 45 minutes at room temperature. Then the trifluoroacetic acid was removed by distillation to give an oily product which was precipitated by the addition of ether. The precipitate was washed with ether several times and dried in a desiccator over NaOH. Then, the precipitate was dissolved in DMF and the resulting solution was adjusted to Ph 7 – 8 by adding 0.1 mg of N-methylmorpholine with stirring under cooling.

To this solution, 342 mg of oily Boc-His(Tos)-OSu was added and the resulting solution was stirred for three days at room temperature. To the reaction solution, ethylacetate was added to cause precipitation and the precipitate was reprecipitated with chloroform-ethylacetate twice to give 334 mg (73.4%) of Boc-His(Tos)-Phe-Ser(Bzl)-Phe-Gly-Leu-Arg(Tos)-Pro-Gly-NH$_2$, having a melting point of 166.0° – 169.5°C.

To 303 mg of this product, 3 ml of trifluoroacetic acid was added with stirring under cooling and the resulting solution was stirred for 45 minutes at room temperature. Then, the trifluoroacetic acid was removed by distillation to give an oily product, which was disolved in ether and precipitated. The precipitate was washed with ether several times and dried in a desiccator over NaOH. Then the precipitate was dissolved in 1 ml of DMF and the resulting solution was adjusted to pH 7 – 8 by adding 0.1 ml of N-methylmorpholine with stirring under cooling. To this solution, 144 mg of Z-(pyro)Glu-OSu was added and the resulting solution was stirred for three days at room temperature. To the reaction solution, ethylacetate was added to cause precipitation and the precipitate was reprecipitated with chloroform-ethylacetate twice to give 298 mg (89.9%) of Z-(pryo)Glu-His(Tos)-Phe-Ser(Bzl)-Phe-Gly-Leu-Arg(Tos)-Pro-Gly-NH$_2$, having a melting point of 133.5° – 137.0°C.

To 190 mg of this product, 0.5 ml of anisole and 5 ml of hydrogen fluoride was added (in hydrogen fluoride reaction vessel) and the resulting solution was stirred for an hour under cooling. Then, hydrogen fluoride was removed by distillation at the same temperature and the residue was dried in a desiccator over NaOH and the resulting residue was dissolved in water. After the solution was washed with ether, the solution was placed on a column of ion-exchange resin Dowex 1 × 2 (AcO$^-$) and eluted with water. The eluate was lyophilized to give a powder. The powder was placed on a column of Sephadex G-25 and eluted with 0.2N-acetic acid. The main fractions were collected and lyophilized to give 87.5 mg of the desired product (pyro)Glu-His-Phe-Ser-Phe-Gly-Leu-Arg-Pro-Gly-NH$_2$. When this product was subjected to paper chromatography and electrophoresis, a single spot was obtained in both cases, and the ninhidrin reaction was negative and Pauri reaction positive.

$[\alpha]_D^{25}$ −57.3° (C 0.3, water)

Analysis calcualted for $C_{53}H_{74}O_{12}N_{16}\cdot2CH_3COOH\cdot5H_2O$
C 51.19, H 6.93, N 16.77
Found   C 51.02, H 7.02, N 16.77

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A compound of the formula:
   (pyro) Glu-Ala-Trp-Ser-Tyr-Gly-Leu-Arg-Pro-Gly-NH$_2$ which is biologically active in decreasing the release of a luteinizing hormone.

2. A compound of the formula:
   (pyro) Glu-His-Phe-Ser-Phe-Gly-Leu-Arg-Pro-Gly-NH$_2$ which is biologically active in increasing the release of a luteinizing hormone.

* * * * *